(12) United States Patent
Mazanek et al.

(10) Patent No.: US 9,216,713 B2
(45) Date of Patent: Dec. 22, 2015

(54) IMPACT PROTECTION DEVICE WITH A LID

(75) Inventors: Jan Mazanek, Billdal (SE); Jörgen Kjellén, Alingsås (SE); Ken Lindberg, Alingsås (SE); Ulf Magnussson, Alingsås (SE); William McLundie, Bromsgrove (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/357,434

(22) PCT Filed: Nov. 11, 2011

(86) PCT No.: PCT/SE2011/051356
§ 371 (c)(1),
(2), (4) Date: Sep. 22, 2014

(87) PCT Pub. No.: WO2013/070129
PCT Pub. Date: May 16, 2013

(65) Prior Publication Data
US 2015/0107928 A1    Apr. 23, 2015

(51) Int. Cl.
*B60R 21/36* (2011.01)
*B60R 21/34* (2011.01)
*B60R 21/216* (2011.01)

(52) U.S. Cl.
CPC ................. *B60R 21/36* (2013.01); *B60R 21/34* (2013.01); *B60R 21/216* (2013.01)

(58) Field of Classification Search
CPC .... B60R 21/34; B60R 21/36; B60R 2021/346
See application file for complete search history.

(56) References Cited

U.S. PATENT DOCUMENTS 5,398,959 A * 3/1995 Avila .......................... 280/728.3
5,653,461 A * 8/1997 Fischer ....................... 280/728.3
(Continued)

FOREIGN PATENT DOCUMENTS

EP    2345564 A1    7/2011
GB    2499032 A     8/2013
(Continued)

OTHER PUBLICATIONS

International Search Report for application No. PCT/SE2011/051356, dated Jul. 4, 2012, 5 pages.
(Continued)

*Primary Examiner* — Drew Brown
(74) *Attorney, Agent, or Firm* — Reising Ethington P.C.

(57) ABSTRACT

The present invention relates to a vehicle pedestrian protection airbag arrangement (7) comprising an airbag (9), a housing (8), an inflating device (10) and a lid (11), the airbag (9) being arranged to be inflated by the inflating device (10) in the case of a collision with a pedestrian when the airbag arrangement (7) is mounted in a vehicle (1). The lid (11) has a first side (11*a*), facing away from the housing (8) and a second side (11*b*), facing the housing (8) when the lid (11) is mounted against the housing (8). The housing has a front wall and a rear wall, in which housing the airbag is stored before inflation. The airbag arrangement (7) further comprises at least one attachment means (12*a*, 12*b*, 13*a*, 13*b*) running between the lid (11) and at least one other part (8, 9) comprised in the airbag arrangement (7). When the airbag (9) is inflated, it is at least partly positioned between the lid (11) and the housing (8).

14 Claims, 6 Drawing Sheets

(56) References Cited

U.S. PATENT DOCUMENTS

| | | | |
|---|---|---|---|
| 5,845,930 A * | 12/1998 | Maly et al. | 280/728.3 |
| 6,189,916 B1 * | 2/2001 | Bowers et al. | 280/728.3 |
| 8,006,997 B2 * | 8/2011 | Inoue et al. | 280/728.2 |
| 2008/0308338 A1 | 12/2008 | Kitte et al. | |
| 2010/0164203 A1 | 7/2010 | Inoue et al. | |
| 2015/0000994 A1 * | 1/2015 | McLundie | 180/274 |

FOREIGN PATENT DOCUMENTS

| | | |
|---|---|---|
| JP | 2004026039 A | 1/2004 |
| JP | 2006096289 A | 4/2006 |
| JP | 2006096290 A1 | 4/2006 |
| JP | 2007196794 A | 8/2007 |
| WO | WO2007085920 A1 | 8/2007 |

OTHER PUBLICATIONS

English Summary of Japanese Office Action corresponding to Japanese Patent Application No. 2014-540998, dated Apr. 14, 2015, 2 pages.

European search report corresponding to application No. 11875509.9, dated Aug. 10, 2015.

* cited by examiner

IMPACT PROTECTION DEVICE WITH A LID

The present invention relates to a vehicle pedestrian protection airbag arrangement comprising an airbag, a housing, an inflating device and a lid. The airbag is arranged to be inflated by the inflating device in the case of a collision with a pedestrian when the airbag arrangement is mounted in a vehicle. The lid has a first side, facing away from the housing and a second side, facing the housing, when the lid is mounted against the housing. The housing has a front wall and a rear wall, in which housing the airbag is stored before inflation.

Today, many vehicles are constructed to comprise at least one exterior airbag, intended to be inflated in the case of a collision with a pedestrian and to alleviate the collision force that the pedestrian is subject to. Such an exterior airbag is for example mounted in a designated housing at the rear end of the vehicle hood, and for both aesthetic and protective reasons, the housing is covered by a lid. This lid is removed when the airbag is activated.

U.S. Pat. No. 7,766,375 discloses a pedestrian air bag where the housing is covered with a lid which is attached by means of clips and a hinge arrangement closest to the windscreen.

However, it is desired to obtain a robust and uncomplicated pedestrian air bag arrangement with reduced weight and improved functionality in relation to prior art.

It is an object of the present invention to provide a pedestrian airbag that is arranged for covering at least two different sections of a vehicle, which sections have different impact requirements which in turn results in different airbag inflation pressure requirements.

Said object is achieved by means of a vehicle pedestrian protection airbag arrangement comprising an airbag, a housing, an inflating device and a lid. The airbag is arranged to be inflated by the inflating device in the case of a collision with a pedestrian when the airbag arrangement is mounted in a vehicle. The lid has a first side, facing away from the housing and a second side, facing the housing, when the lid is mounted against the housing. The housing has a front wall and a rear wall, in which housing the airbag is stored before inflation. The airbag arrangement further comprises at least one attachment means running between the lid and at least one other part comprised in the airbag arrangement such that when the airbag is inflated, the airbag is at least partly positioned between the lid and the housing. Then the lid is held in contact with the airbag by means of the attachment means.

According to an example, said attachment means is attached to the second side of the lid, to a front wall of the housing and to a rear wall of the housing. Alternatively, said attachment means is attached to the second side of the lid and to the airbag.

According to another example, when the airbag is inflated, the lid is positioned offset from the housing at an angle with respect to the lid's original position, the offset position and the angle being in dependence of the configuration of said attachment means.

According to another example, each attachment means comprises a front strap and a rear strap, each front strap being attached to the second side of the lid and to the front wall of the housing and each rear strap being attached to the second side of the lid and to the rear end of the housing. Each front strap and rear strap pair may be formed in one piece, divided at the attachment to the lid.

According to another example, the lid is attached to the housing, and/or the vehicle body, by means of an additional attachment means such as for example clips, rivets or hooks.

Other examples are evident from the dependent claims.

A number of advantages are obtained by means of the present invention. For example:

A robust design;

Insensitive to shifting material characteristics in different environments; and

Equalizing the impact force over the inflated airbag.

BRIEF DESCRIPTION OF THE DRAWINGS

The present invention will now be described more in detail with reference to the appended drawings, where.

DETAILED DESCRIPTION

Figure 1:
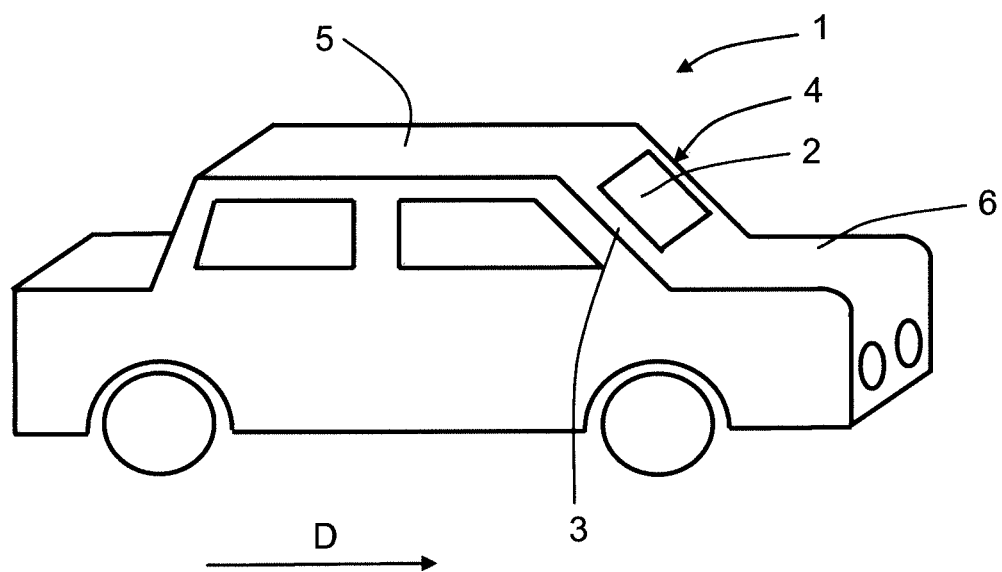
FIG. 1 shows a schematic side view of a vehicle.
Figure 2:
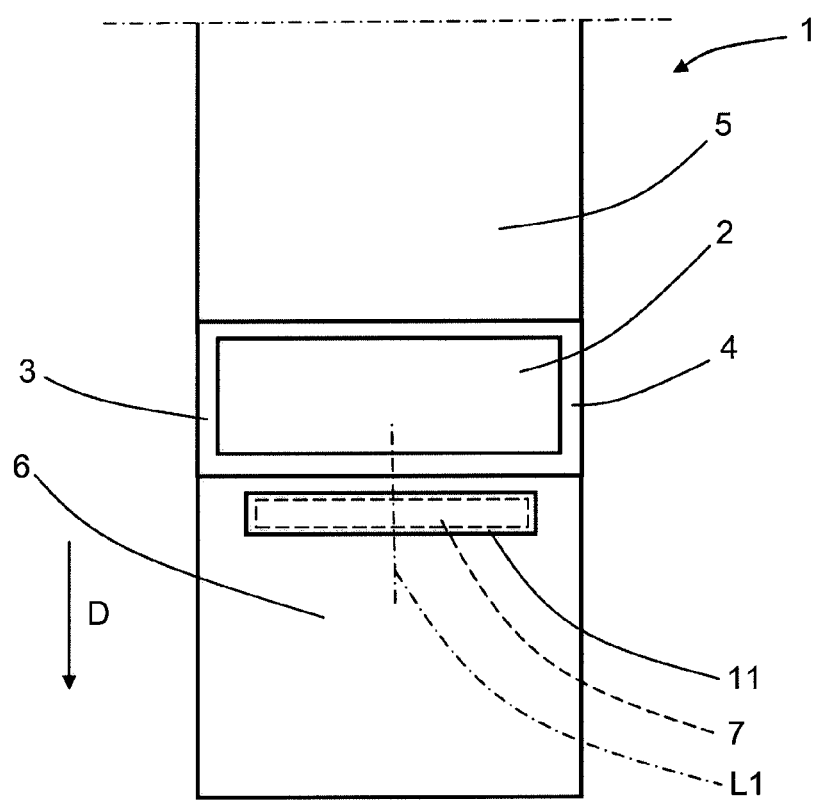
FIG. 2 shows a schematic top view of the front part of a vehicle.

With reference to FIG. 1 and FIG. 2, a vehicle 1 comprises a windscreen 2 and so-called A-pillars; a first A-pillar 3 at a right-hand side of the windscreen 2 and a second A-pillar 4 at a left-hand side of the windscreen 2. The A-pillars are well-known in the field of vehicles, and run to a roof 5 of the vehicle 1. The right-hand side and left-hand side are defined when viewing along the vehicle in its forward running direction D. The vehicle also comprises a hood 6.

Figure 3:
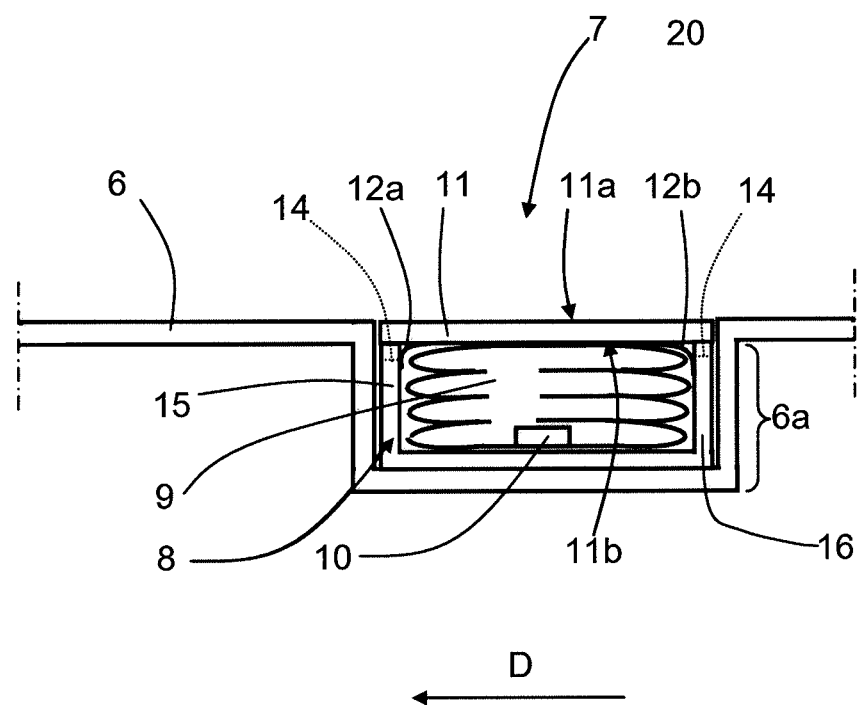
FIG. 3 shows a schematic cut-open view of a vehicle pedestrian airbag arrangement according to the present invention in a mounted normal position.
Figure 4:
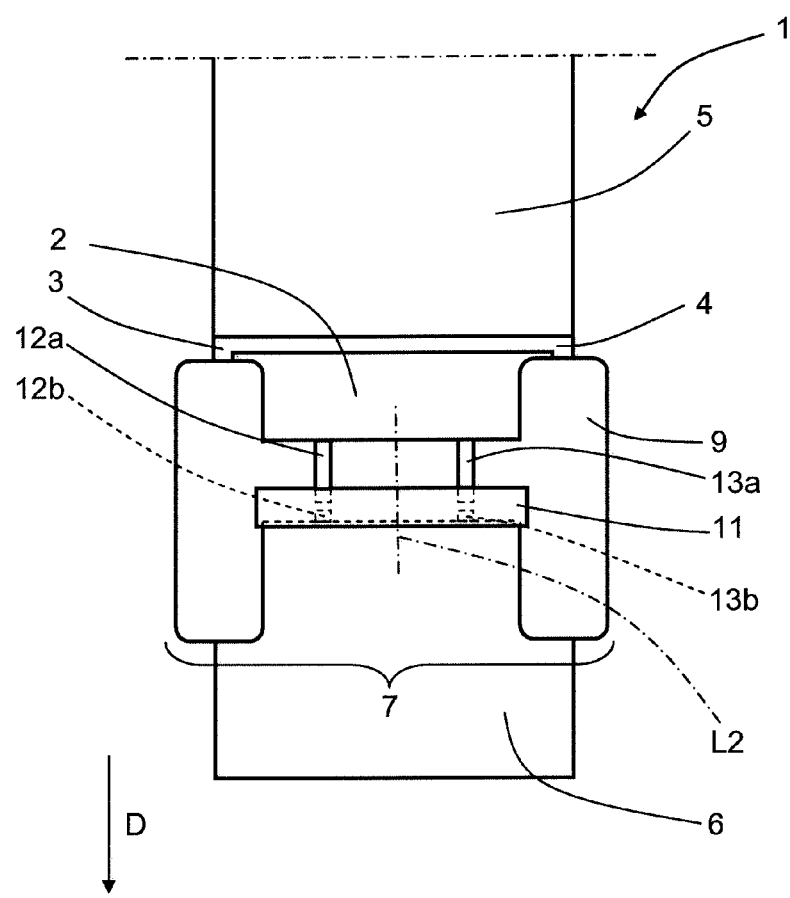
FIG. 4 shows a schematic top view of the front part of a vehicle with an airbag according to the present invention inflated.
Figure 5:
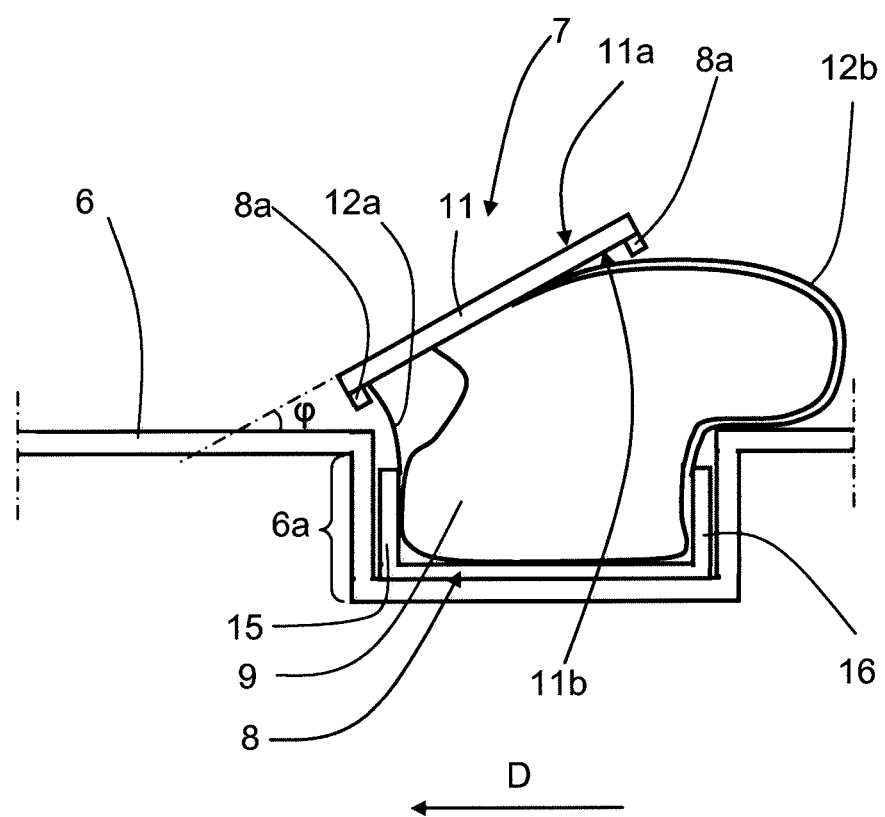
FIG. 5 shows a schematic cut-open view of a vehicle pedestrian airbag arrangement according to the present invention in an inflated position.

FIG. 2 and FIG. 3 show the vehicle pedestrian airbag arrangement 7 at a normal mounted position, and FIG. 4 and FIG. 5 show the vehicle pedestrian airbag arrangement 7 when the airbag 9 has been inflated. FIG. 3 shows a schematic cut-open view along a line L1 in FIG. 2 and FIG. 5 shows a schematic cut-open view along a line L2 in FIG. 4.

With reference to FIG. 2 and FIG. 3, a vehicle pedestrian airbag arrangement 7 is shown. The vehicle pedestrian airbag arrangement 7 is shown mounted to the vehicle 1, positioned at the rear side of the hood 6 and comprises a housing 8, an airbag 9, a pyrotechnic device 10 arranged for inflating the airbag 9 in the event of a collision, and a lid 11, closing the housing 8. The lid 11 has a first side 11a facing away from the housing 8 and a second side 11b, facing the housing 8.

In the event of a collision with a pedestrian, it is desirable that the pedestrian's impact with the vehicle 1 is alleviated, and therefore the airbag 9 is mounted in such a way that when inflated, it is arranged to at least partly cover the windscreen 2 and the A-pillars 3, 4, as indicated in FIG. 4. In this way, the inflated airbag 6 relieves some of the impact force. The windscreen 2 has been found to be a suitable energy absorber and thus not so severe to hit as the A-pillars 3, 4, and the airbag 7 has been shaped accordingly, here shown to have a dog-bone shape.

According to the present invention, with reference to FIG. 3, FIG. 4 and FIG. 5, the vehicle pedestrian airbag arrangement 7 comprises a first strap pair 12a, 12b and a second strap pair 13a, 13b, each strap pair 12a, 12b; 13a, 13b in turn comprising a front strap 12a, 13a and a rear strap 12b, 13b. Each front strap 12a, 13a is shorter than said rear strap 12b, 13b, each strap 12a, 12b, 13a, 13b being attached to the housing 8 and the second side 11b of the lid 11. Each front strap 12a, 13a is attached more frontward on the lid 11 than the corresponding rear strap 12b, 13b. Furthermore, each front strap 12a, 13a is attached to a front wall 15 of the housing and each rear strap 12b, 13b is attached to a rear wall 16 of the housing.

Generally, the terms front and rear relates to the front and rear of a vehicle to which the airbag arrangement 7 is mounted, the front and rear being related to the vehicle's direction of forward running direction D.

Alternatively, each strap pair 12a, 12b; 13a, 13b may be made in one piece, which only is fastened at a central part of the second side 11b of the lid 11. The point of attachment then divides the strap pairs 12a, 12b; 13a, 13b into the corresponding front and rear straps.

As shown in FIG. 5, when the airbag 9 has been inflated, the Straps 12a, 12b, 13a, 13b hold the lid 11 in contact with the airbag 9, where the different lengths of the straps in each pair 12, 13 position the lid 11 in a way that is predetermined by the airbag shape in the specific application. In this example, as shown in FIG. 5, the detached lid 11 is positioned offset from the housing 8, forming an angle φ relative the lid's original position, sharing the same general direction as the windscreen 2 relative to the hood 6. The lid 11 thus provides guidance of the airbag deployment direction. After inflation, the airbag 9 is positioned between the lid 11 and the housing 8.

Preferably, the straps 12a, 12b, 13a, 13b are not the only attachment between the housing 8 and the lid 11. In order to provide a sufficiently weather sealed environment for the airbag 9 and the pyrotechnic device 10 inside the housing 8, the lid 11 is for example mounted to the housing 8 with additional attachment means if the form of for example clips, rivets or hooks. Alternatively, the lid 11 may be mounted to the hood 6 in a similar way. The lid 11 may also be mounted to any other suitable vehicle body part in dependence of where the airbag arrangement 7 is mounted at the vehicle 1, as indicated later in the description. Upon deployment of the airbag 9, the mounting attachment between the lid 11 and the housing 8, or hood 6, is released or broken.

The lid 11 is normally at least mounted against the housing 8, and may also be mounted to the housing 8.

In this example, as shown in FIG. 3, the lid 11 is attached to the housing 8, where the housing 8 comprises a tear portion 14 between the lid 11 and the housing 8 indicated with dotted lines. The tear portion 14 may comprise thinner material thickness or a perforation along a predetermined tear line. In FIG. 5, after deployment, the tear portion 14 has been broken, such that a piece of the housing 8a, which originally was positioned between the tear portion 14 and the lid 11, remains attached to the lid 11.

For example, the housing 8 may be made of plastic and the lid 11 may be made of aluminum, the plastic housing material comprising the tear portion 14. If also the housing 8 is made of metal, then a separate joining piece made from plastic (not shown) may be used, since this would also provide a suitable tearing material. Such a joining piece could form a part of the lid.

It should be noted that a specific strap configuration and airbag folding/packaging will be required in order to allow unfolding of any peripheral portions of the airbag that is being of a different shape than the central chamber of the airbag.

The housing 8 has a longitudinal extension that runs perpendicular to the forward running direction D, and a width in the forward running direction D. The housing 8 is shown to be positioned in a folded portion 6a of the hood 6 as shown in FIG. 3 and FIG. 5, but many other types of positioning are conceivable, for example in a plenum part positioned between the hood and the windscreen.

The housing and the rest of the airbag arrangement 7 may be placed at another position at the vehicle 1, for example at the roof 5 as a protection for bicyclists which may impact higher up on the vehicle 1 at the occurrence of a collision.

The important features of the airbag arrangement 7 according to the present invention are that the airbag arrangement 7 comprises an airbag 9, a housing 8, an inflating device 10, which for example is in the form of a pyrotechnic device, and a lid 11. The lid 11 has a first side 11a, facing away from the housing 8 and a second side 11b, facing the housing 8 when the lid 11 is mounted to the housing 8, the housing 8 having a front wall and a rear wall. The airbag arrangement 7 further comprises at least one attachment means 12a, 12b; 13a, 13b running between the lid 11 and at least one other part 8, 9 comprised in the airbag arrangement 7, in particular the housing 8 or the airbag 9. In this way, the airbag 9 is at least partly positioned between the lid 11 and the housing 8 when the airbag 9 is inflated, the lid 11 being held in contact with the airbag by means of the attachment means 12a, 12b; 13a, 13b.

The invention is not limited to the examples above, but may vary freely within the scope of the appended claims. For example, the pairs of straps used may be formed from one piece, such as a sail. Furthermore, the straps may be mounted to the inside or the outside of the housing. The straps are generally constituted by at least one attachment means.

The straps are preferably flexible, and may be attached to the airbag 9 instead of the housing 8, then at a front end and a rear end of the inflated airbag 9.

The pyrotechnic device 10 is generally constituted by an inflating device.

The lid 11 is arranged to at least partly close the housing, preferably providing a sufficient protection for the airbag 9 and possible other parts in the housing such as the inflating device 10.

Any number of strap pairs may be used. As indicated above, each strap pair may be formed by one strap piece, divided at an attachment position at the lid 11.

Figure 6:
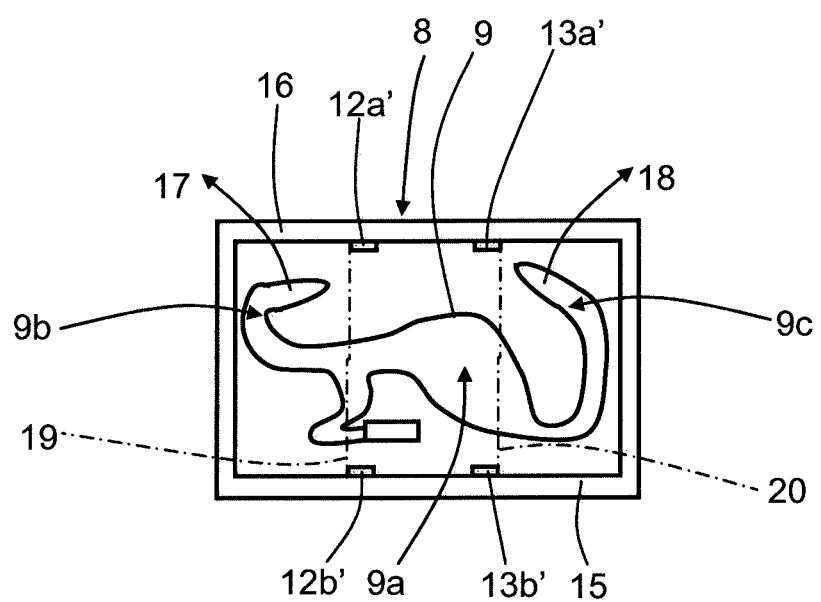
FIG. 6 shows a schematic cut-open top view of a vehicle pedestrian airbag arrangement according to the present invention in a deflated position, showing the airbag folded in the housing.

FIG. 6 shows a schematic cut-open top view of the 8 housing and illustrates how the airbag 9 may be folded in order to be enable a deployment that is not disturbed by the straps 12a, 12b, 13a, 13b. The housing is shown without the lid, and the straps are only shown at their attachments 12a' 13a' at the front wall 15 and their attachments 12b' 13b' at the rear wall 16.

The airbag 9 in this example is intended to be inflated to the dog-bone shape as shown in FIG. 4. The airbag 9 thus comprises a central chamber 9a, a first rear chamber 9b and a second rear chamber 9c. With reference also to FIG. 4, the central chamber is intended to be deployed to a part running below the windscreen 2, and the rear chambers 9b, 9c are intended to be deployed to parts at least partly running along the corresponding A-pillars 3, 4.

The rear chambers 9b, 9c are arranged to be deployed away from the housing 8, indicated with corresponding arrows 17, 18. In order to obtain a deployment that is not disturbed by the straps, none of the rear chambers 9b, 9c should be positioned more central in the housing 8 than the outermost positions of the closest of the strap attachments 12a' 13a'; 12b' 13b'. The outermost positions of the strap attachments 12a' 13a'; 12b' 13b' are indicated with dash-dotted lines 19, 20 in FIG. 6.

The rear chambers 9b, 9c are each shown to consist of one folding of the airbag 9 before deployment, but of course each rear chamber 9b, 9c may consist of several foldings before deployment. Thus, generally, none of the rear chamber 9b, 9c foldings should at any position be positioned more central in the housing than the outermost position of the closest strap attachment 12a' 13a'; 12b' 13b'. Practically, this means that none of the rear chamber 9b, 9c foldings should at any position cross the dash-dotted lines 19, 20 in FIG. 6.

In this context, a folding may be regarded as a part a of rear chamber 9b, 9c that mainly runs in one direction along the windscreen, the next folding more or less mainly running in the opposite direction.

The invention claimed is:

1. A vehicle pedestrian protection airbag arrangement comprising an airbag, a housing, an inflating device and a lid, the airbag being arranged to be inflated by the inflating device in the case of a collision with a pedestrian when the airbag arrangement is mounted in a vehicle, the lid having a first side, facing away from the housing and a second side, facing the housing when the lid is mounted against the housing, the housing having a front wall and a rear wall, in which housing the airbag is stored before inflation, characterized in that the airbag arrangement further comprises at least one attachment means attached to the second side of the lid and to the airbag and running therebetween such that when the airbag is inflated, the airbag is at least partly positioned between the lid and the housing, the lid being held in contact with the airbag by means of the attachment means.

2. A vehicle pedestrian protection airbag arrangement comprising an airbag, a housing, an inflating device and a lid, the airbag being arranged to be inflated by the inflating device in the case of a collision with a pedestrian when the airbag arrangement is mounted in a vehicle, the lid having a first side, facing away from the housing and a second side, facing the housing when the lid is mounted against the housing, the housing having a front wall and a rear wall, in which housing the airbag is stored before inflation, characterized in that the airbag arrangement further comprises at least one attachment means running between the lid and at least one other part comprised in the airbag arrangement such that when the airbag is inflated, the airbag is at least partly positioned between the lid and the housing, the lid being held in contact with the airbag by means of the attachment means, wherein when the airbag is inflated, the lid is positioned offset from the housing at an angle ($\phi$) with respect to the lid's original position, the offset position and the angle ($\phi$) being in dependence of the configuration of said attachment means.

3. A vehicle pedestrian protection airbag arrangement according to claim 2, characterized in that said attachment means is attached to the second side of the lid, to a front wall of the housing and to a rear wall of the housing.

4. A vehicle pedestrian protection airbag arrangement according to claim 2, characterized in that each attachment means is comprised by a flexible element.

5. A vehicle pedestrian protection airbag arrangement according to claim 2, characterized in that each attachment means comprises a front strap and a rear strap, each front strap being attached to the second side of the lid and to the front wall of the housing and each rear strap being attached to the second side of the lid and to the rear end of the housing.

6. A vehicle pedestrian protection airbag arrangement according to claim 5, characterized in that each front strap is shorter than the corresponding rear strap.

7. A vehicle pedestrian protection airbag arrangement according to claim 2, characterized in that the lid is attached to the housing by means of an additional attachment means.

8. A vehicle pedestrian protection airbag arrangement comprising an airbag, a housing, an inflating device and a lid, the airbag being arranged to be inflated by the inflating device in the case of a collision with a pedestrian when the airbag arrangement is mounted in a vehicle, the lid having a first side, facing away from the housing and a second side, facing the housing when the lid is mounted against the housing, the housing having a front wall and a rear wall, in which housing the airbag is stored before inflation, characterized in that the airbag arrangement further comprises at least one attachment means running between the lid and at least one other part comprised in the airbag arrangement such that when the airbag is inflated, the airbag is at least partly positioned between the lid and the housing, the lid being held in contact with the airbag by means of the attachment means, wherein when the airbag is inflated, the lid is positioned offset from the housing and inclined at an angle ($\phi$) with respect to the lid's original position such that the front edge of the lid is closer to the housing than the rear edge of the lid in a plane perpendicular to the lid's original position, the offset position and the angle ($\phi$) being in dependence of the configuration of said attachment means.

9. A vehicle pedestrian protection airbag arrangement according to claim 8, characterized in that said attachment means is attached to the second side of the lid, to a front wall of the housing and to a rear wall of the housing.

10. A vehicle pedestrian protection airbag arrangement according to claim 8, characterized in that said attachment means is attached to the second side of the lid and to the airbag.

11. A vehicle pedestrian protection airbag arrangement according to claim 8, characterized in that each attachment means is comprised by a flexible element.

12. A vehicle pedestrian protection airbag arrangement according to claim 8, characterized in that each attachment means comprises a front strap and a rear strap, each front strap being attached to the second side of the lid and to the front wall of the housing and each rear strap being attached to the second side of the lid and to the rear end of the housing.

13. A vehicle pedestrian protection airbag arrangement according to claim 12, characterized in that each front strap is shorter than the corresponding rear strap.

14. A vehicle pedestrian protection airbag arrangement according to claim 8, characterized in that the lid is attached to the housing by means of an additional attachment means.

* * * * *